June 23, 1970  D. R. PAXTON  3,516,249
PAXTON VAPOR ENGINE CYCLE
Filed June 7, 1968  4 Sheets-Sheet 1
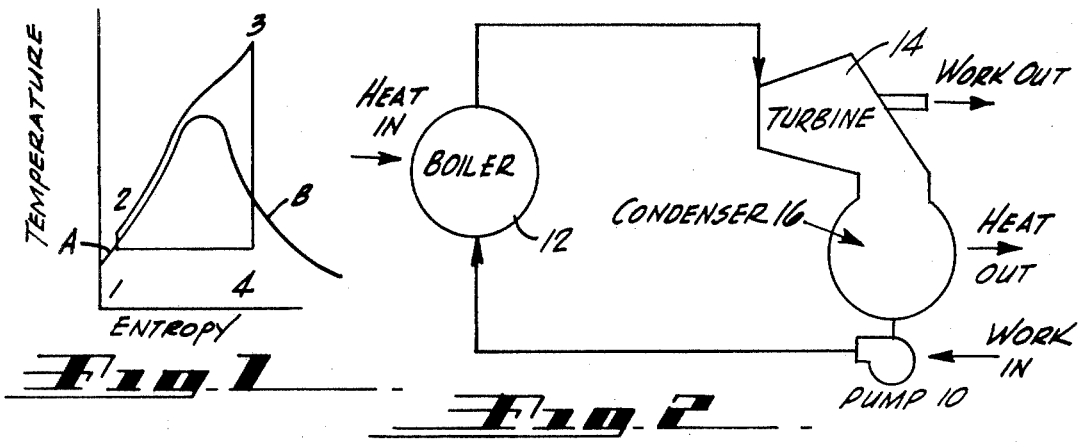
Fig. 1.
Fig. 2.
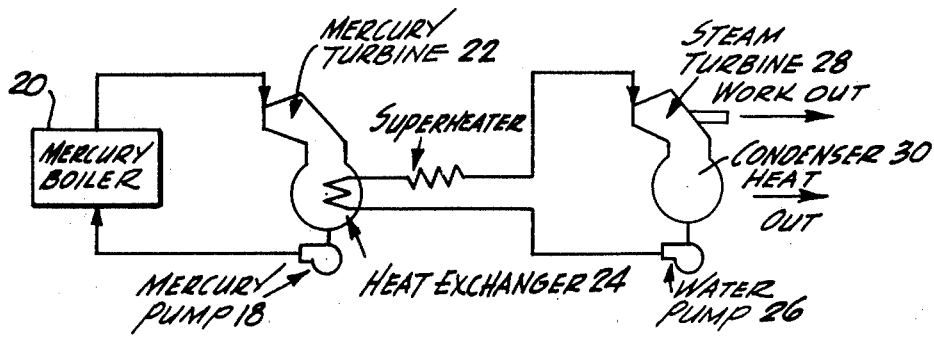
Fig. 4.
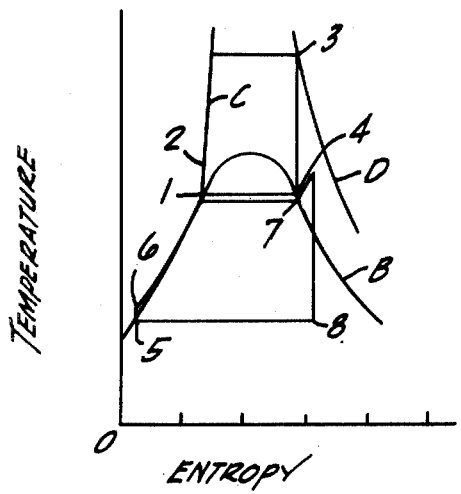
Fig. 3.
INVENTOR.
DOUGLAS R. PAXTON
BY Robert O. Richardson
-ATTORNEY- INVENTOR
DOUGLAS R. PAXTON
BY Robert O. Richardson
-ATTORNEY-

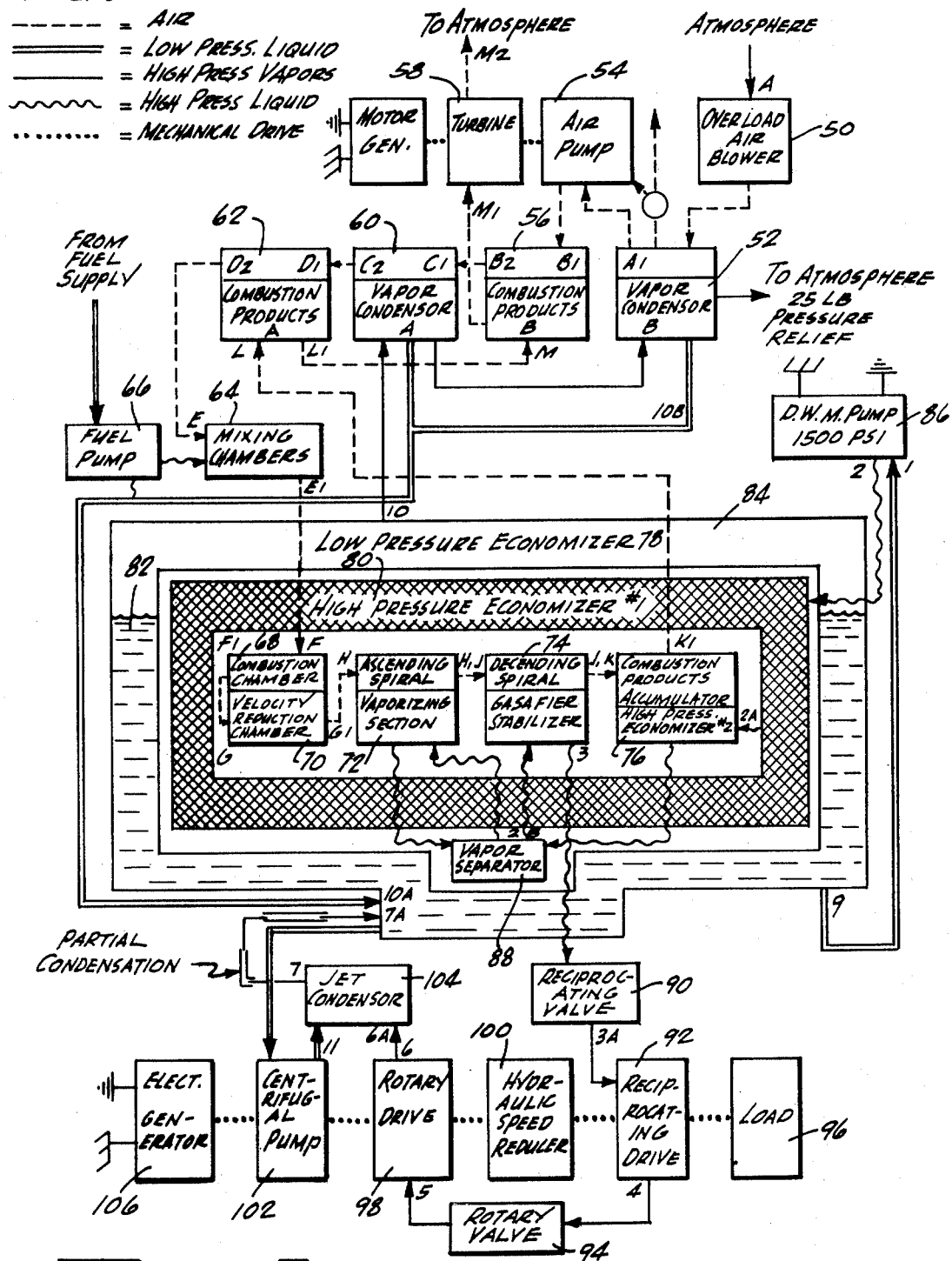

United States Patent Office 3,516,249
Patented June 23, 1970

1

3,516,249
PAXTON VAPOR ENGINE CYCLE
Douglas R. Paxton, Box AZ, Main Post Office,
Ventura, Calif. 93001
Filed June 7, 1968, Ser. No. 735,223
Int. Cl. F01k *25/06;* F01b *21/00*
U.S. Cl. 60—38                                                  5 Claims

ABSTRACT OF THE DISCLOSURE

A method of converting internal, chemical, or other heat-convertible energy into mechanical energy using two working mediums, a gaseous and a dense working medium, by first converting fuel energy into heat energy, which is absorbed by the gaseous medium, at constant pressure, then transferring the heat energy from the gaseous medium to the dense medium at constant volume, thus converting the heat energy into internal molecular energy or potential energy by reason of distortion, converting a portion of the potential energy by reason of distortion into mechanical energy in a reciprocating drive and converting the kinetic energy in the exhaust from the reciprocating drive into mechanical energy in a rotary drive which is added to the mechanical energy of the reciprocating drive, and recycling any remaining heat energy back through the system via the gaseous working medium.

BACKGROUND OF THE INVENTION

There has been an ever-increasing need to provide mechanical energy in the form of torque, i.e. force of rotation, at ever changing load and speed with optimum power-to-weight and power-to-size ratio and high thermal efficiency. Other desirable features in apparatus for conversion of other kinds of energy, such as chemical, nuclear, etc., include lack of noise, lack of hydrocarbons in the exhaust, lack of vibrations caused by explosions and low temperature, low velocity exhaust. Such apparatus utilizes a working medium such as air, water, or other fluid which serves to convert the basic energy into mechanical energy. This is done by successively passing the working medium through the various stages of the apparatus during which the medium passes through a series of states or cycles and as a result of which useful mechanical work is produced. Most energy conversion apparatus is identified by the cycle on which it operates, such as the Diesel, Rankine, Brayton, Sterling and Feher cycle, to mention but a few. There are also cycles which are incapable of achievement by mechanical apparatus, such as the Carnot cycle, for example, which are used merely as yardsticks to gage the efficiency of other cycles.

Most cycles result in torque only at high speed, or at one specific speed such as the Brayton cycle and Sterling cycle, when reduced to a mechanical achievement. The supercritical Rankine cycle and Feher cycle are capable of producing torque without high speed, but their efficiency in converting heat energy into mechanical energy is low, both in practice and theory.

The Brayton cycle is a gaseous compression cycle wherein the compression work is a significant factor. In the Sterling cycle, both constant temperature and constant volume expansion and compression are used and, hence, heat is added and subtracted during both the compression and expansion portions of the cycle.

The supercritical Rankine cycle is a liquid compression cycle requiring a very small amount of pump work, with a vapor or gaseous expansion after heat addition, and then heat rejection to a heat sink to achieve liquid compression. The necessary heat rejection to achieve liquid compression represents a thermal loss which would require massive and extensive equipment to recover.

2

The Feher cycle is similar to the supercritical Rankine cycle except that all the pressures in the cycle are above the critical pressure of the working fluid.

SUMMARY OF THE PRESENT INVENTION

The present invention relates to a method of converting chemical energy into mechanical energy through a heat engine cycle, hereinafter called the Paxton Cycle. In this cycle two working mediums are used wherein heat energy is transferred back and forth between them during the cycle to retain within the system substantially all heat energy until it can be converted into mechanical energy. Since all the heat contained in the dense working medium cannot be converted to mechanical energy in one pass through the drive unit without infinite multiple expansions into an artificial atmosphere, this heat must be cycled back for another pass through the unit. To provide liquid compression for the dense working medium after it has expanded through the drive unit, the remaining excess heat is transferred at low temperature back to the gaseous working medium at a point after it has already undergone compression but before its temperature has been raised by heat addition from an outside source. Heat is received into the system and rejected from the system by the gaseous working medium. Heat energy is converted to mechanical energy by the dense working medium.

The Paxton Vapor Engine Cycle converts energy in fuel into heat energy which is absorbed by air and products of combustion. This heat energy is transferred to a denser working medium such as an organic fluid. The heat addition raises the temperature of the fluid which is under pressure to keep it from expanding. The density of the heated fluid is maintained by the high pressure until the fluid is released into a cylinder having a piston. At this point the fluid expands, driving the piston back. When the piston reaches the end of the stroke the fluid passes out of the cylinder through nozzles which cause it to impinge on the blades of the turbine. These blades are hydraulically coupled to the same crank shaft to which the piston is connected. These blades also will drive a rotary pump. This pump is on a common shaft with the blades. This pump takes working fluid out of the low presure heat exchanger and forces it through a jet pump, which includes a venturi, whose low pressure side is directly connected to the exhaust manifold of the turbine. This reduces the back pressure on the turbine by inducing the flow of working medium from the turbine exhaust to the low pressure heat exchanger. The uncondensed portion of the working medium rises to the top of the heat exchanger where it transfers the latent heat of condensation to the air entering the combustion chamber, thus conserving heat energy that otherwise would be lost. A hydrocarbon fuel is introduced into the preheated air through a mixing chamber after which it is oxidized and the heat of chemical reaction (combustion) is transferred first to the products of combustion and inert gases, then from this gaseous working medium into the dense working medium. The products of combustion now enter a heat exchanger where the remaining heat is transferred to the air entering the fuel-air mixing chambers. There are three parts to this vapor engine: (1) Heat transfer unit or vapor generator. This transforms heat from the heat source to the gaseous working medium, then to the liquid medium which is kept under pressure. (2) The drive unit. This unit converts heat from the vapor (by depressurizing the heated liquid) into mechanical energy. (3) Condenser or liquifying unit. This unit converts the vapor back to a liquid again for reuse and recycles remaining heat back to the gaseous working medium. The vapor generator consists of a series of mixing chambers in which fuel is mixed with the oxygen in the air. A continuous chemical reaction occurs after the fuel is ignited and provision is made for optimum heat transfer to the noncombustible gases in air such as nitrogen, carbon dioxide, and so forth. These heated gases flow around a closed path containing a dense working medium and also preheat the air going into the mixing chambers. The third element in the vapor generator is a closed path for the dense working medium. Inside the closed path the liquid has been pressurized to above the critical pressure for the medium being used. There is a heat exchanging relationship between the dense working medium and the heated gases from the combustion chambers which produces a hot liquid under pressure.

In the drive unit a small amount of hot liquid under pressure goes into a cylinder where it vaporizes, expands, and pushes on a piston. A metering device controls the amount of liquid and the timing during the piston's stroke When the piston reaches the end of the stroke an exhaust valve opens and vapor from the cylinder is further used by turning a vaned rotor. The piston and the rotor use the same crank shaft. The rotor drive is coupled to the crank shaft by a hydraulic torque converter built into the hub of the rotary drive. The vanes on the rotary drive must, for best efficiency, move away from the nozzles at half the nozzle velocity. This results in the velocity of the vapor as it leaves the rotor vanes approaching zero and thus most of the kinetic energy of the vapor has been converted to mechanical energy, as is well known. The high speed side of the rotary drive is directly coupled to a centrifugal pump. This pump forces cooler working medium into the jet condenser. It (1) increases pressure and thus liquifies the vapor; (2) transfers heat from the exhaust vapor to the cooler working medium; and (3) reduces the back pressure on the exhaust side of the rotary drive. The third part, the condenser or liquifying unit, includes a jet condenser on the exhaust side of the rotary drive which combines exhaust vapor with a cooler liquid working medium which has been pumped into it by the centrifugal pump. This causes partial condensation, reduces back pressure on the rotary drive and increases pressure in the low pressure heat exchanger, causing additional liquifying of the vapor. The low pressure economizer is a liquid storage container which also separates remaining vapor from the liquid and uses the vapor to preheat the air entering the mixing chambers. Operating from the drive unit is another pump which is used to build up the pressure of the liquid from the low pressure economizer for introduction into the vapor generator or heat transfer unit. Now the liquid is ready for use again.

Basic differences between the Paxton Cycle and other cycles include the following:

(1) The Paxton Cycle is a practical energy conversion cycle which describes, not an ideal method of converting the potential energy in an organic fuel into mechanical energy, but rather, the practical mechanical means by which this conversion may be accomplished.

(2) The Paxton Cycle is capable of noncontinuous operation, having the ability of mechanical achievement on a stop and start basis, with a fuel consumption corresponding to the amount of mechanical energy delivered, even in starting maximum loads. This is essentially a torque producing cycle, which if interrupted, lies dormant and responds upon demand.

(3) The Paxton Cycle makes use of two working mediums in converting the potential energy of the fuel into heat energy and then retaining that heat energy within the system until it can be converted to mechanical energy.

(4) The Paxton Cycle operates within and makes use of the earth's atmospheric environment, starting and stopping at atmospheric pressure and temperature with its variations from sea level to higher altitudes, without undue expenditure of energy to create an atmosphere more conducive to its operation.

(5) In the Paxton Cycle, since all the heat contained in a working medium cannot be converted to mechanical energy in one expansion through a drive unit, the heat is cycled back through the same system rather than being further expanded in additional sections.

(6) The Paxton Cycle provides for extreme range in the variations in expansion of its dense working medium occasioned by changes in power requirements, on an instant basis.

(7) The Paxton Cycle uses both liquid and gaseous compression. The work necessary for gaseous compression is reduced to a minimum by the use of two working mediums transferring the heat energy back and forth.

(8) In the Paxton Cycle, rejection of heat from the system is not necessary to achieve liquid compression of the dense working medium.

(9) In the Paxton Cycle, the ratio between maximum and minimum temperatures is increased without the necessity of extreme temperature ranges in the expander units, thereby increasing the theoretical maximum efficiency.

(10) The Paxton Cycle makes possible the use of working mediums which are less antagonistic toward the other materials involved in the mechanics of practical achievement.

(11) The Paxton Cycle makes possible the mechanical achievement of efficiencies which, with other cycles, are theoretical at varying speeds and varying load conditions.

BRIEF DESCRIPTION OF THE DRAWINGS

FIG. 1 is a temperature-entropy diagram showing a supercritical Rankine cycle,

FIG. 2 is a schematic representation of apparatus making use of the supercritical Rankine cycle, FIG. 3 is a temperature entropy diagram showing a cycle using heat transfer between two working mediums, FIG. 4 is a schematic representation of apparatus making use of the cycle shown in FIG. 3.

FIG. 7 is a block diagram showing the flow paths of the two working mediums through the various stages of the Paxton Cycle.

DETAILED DESCRIPTION OF PREFERRED EMBODIMENT

Figure 5:
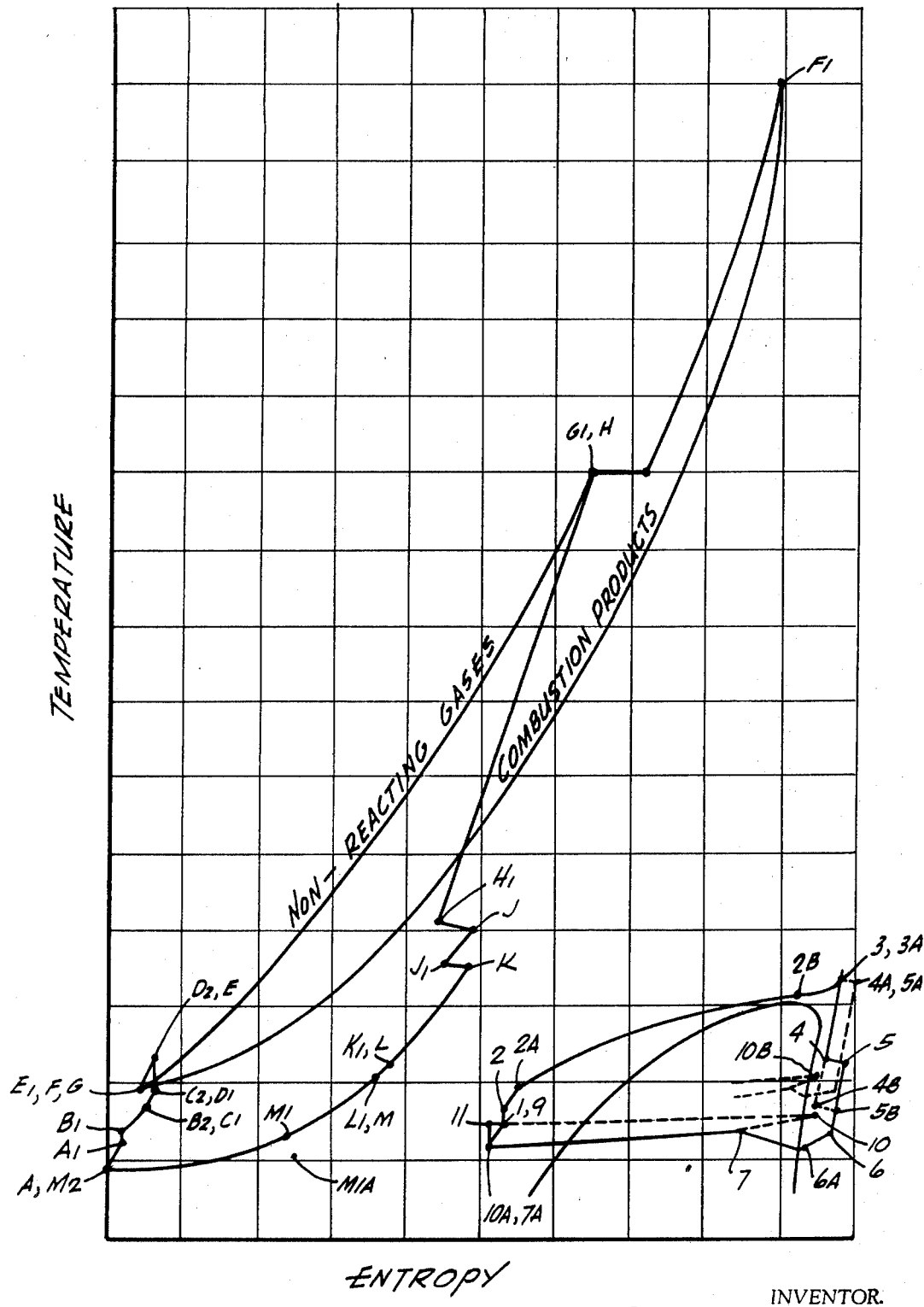
FIG. 5 is a temperature-entropy diagram of two exemplary working mediums used in the Paxton Cycle.

Reference is now made to FIG. 1 which illustrates the temperature-entropy states through which the working medium passes during compression, receiving heat from an outside source, expansion, and condensation in the supercritical Rankine cycle. Curved line AB represents the vapor dome within which the medium is a mixture of liquid and vapor, to the left of the dome a liquid, to the right of the dome a dry vapor. Briefly, upon compression, from point 1 to point 2, the liquid working medium is compressed with an increase in temperature at constant entropy (B.t.u./lb. °F.). Heat is added from an outside source with an increase in temperature and an increase in entropy at constant pressure, which is above critical pressure for the specific working medium, keeping the line 2 to 3 always outside the vapor dome. The liquid becomes a vapor without a liquid-vapor interface (no latent heat of vaporization) as the line 2 to 3 passes a temperature which is level with that of the peak of the vapor dome (critical temperature). From points 3 to 4 the working medium expands at constant entropy, with drop in temperature, increase in volume, and drop in pressure. At a point between 3 and 4 the working medium enters the vapor dome which results in partial condensation of the working medium if the expansion of the medium is carried beyond the point of intersection as shown in the diagram. From point 4 to point 1 heat is rejected by the working medium to an outside heat sink which causes the working medium to revert back to a liquid with a drop in entropy, at constant temperature, constant pressure and decrease in volume.

The apparatus shown in FIG. 2 may be used to carry out the functions described in FIG. 1. The pump 10 is used to achieve the compression from points 1 to 2. The boiler 12 is used to raise the temperature from point 2 to point 3. The turbine 14 expands the working medium from point 3 to point 4 and the condenser 16 extracts the heat from point 4 to point 1.

Reference is now made to FIG. 3 wherein is shown the temperature-entropy states through which two working mediums pass during compression, receiving heat from an outside source, transferring heat from one working medium to the other, expansion and condensation. The curved line A, B represents the vapor dome for the water working medium. Lines C, D represent the vapor dome for mercury. Briefly, from point 1 to point 2 the mercury is compressed, from point 2 to point 3 the mercury receives heat, from point 3 to point 4 the mercury expands, from point 4 to point 1 the mercury rejects heat to the water working medium during condensation of the mercury. From point 5 to point 6 the water is compressed, from point 6 to point 7 the water receives heat from the mercury, turning it into steam. From point 7 through 8 and back to 5 the cycle is the same as that in FIG. 1.

In FIG. 4 there is shown apparatus for carrying out the functions described in FIG. 3. The mercury pump 18 is used to achieve the compression from points 1 to 2 in FIG. 3. The mercury boiler 20 is used to raise the temperature from point 2 to point 3. The mercury turbine 22 expands the mercury vapor from point 3 to point 4. The heat exchange 24 condenses the mercury from point 4 to point 1. The water pump 26 achieves the compression from 5 to 6. The heat exchanger 24 raises the temperature from 6 to 7. The steam turbine 28 expands the vapor from 7 to 8. The condenser 30 extracts the heat from point 8 to point 5.

Figure 6:
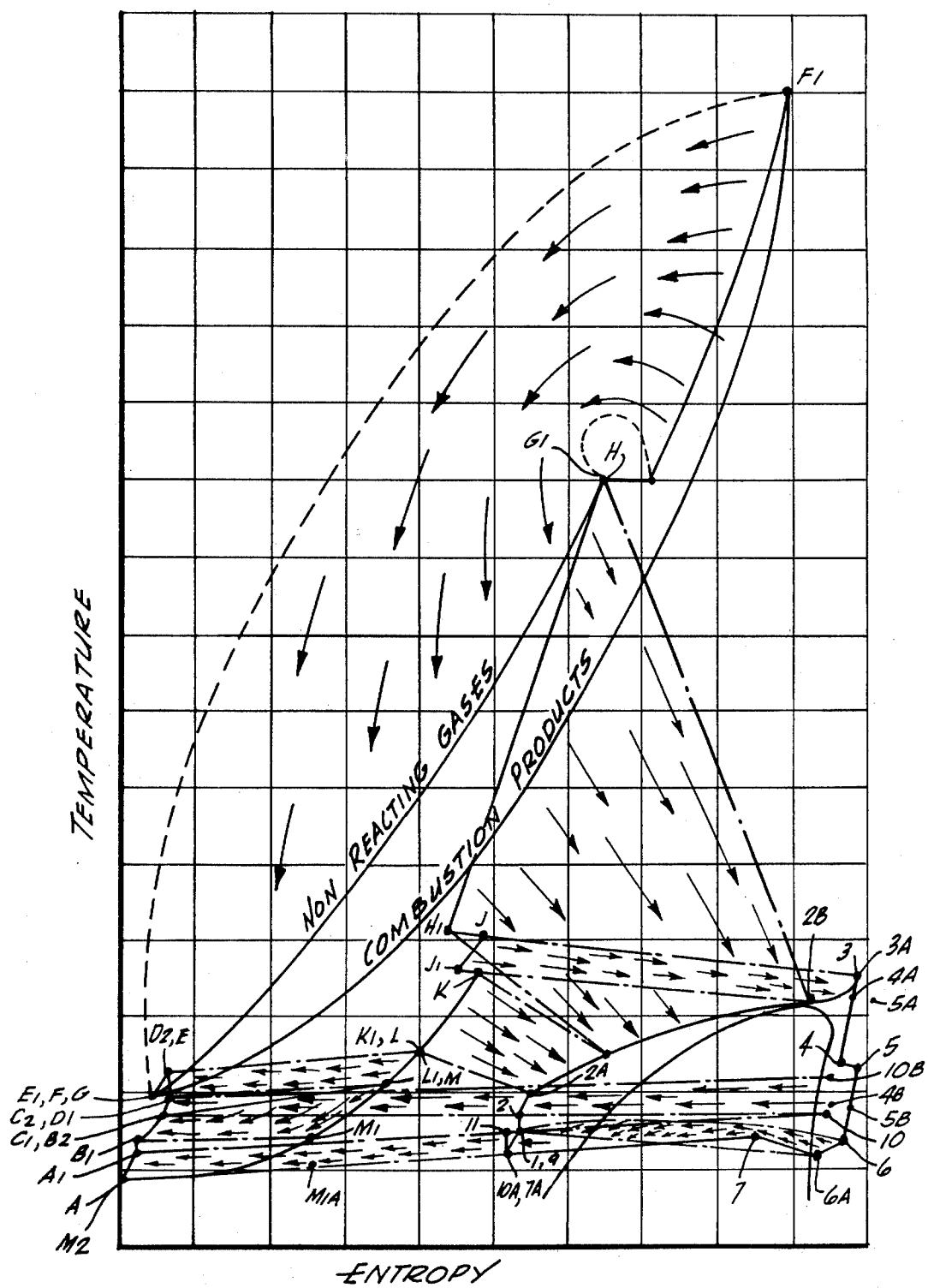
FIG. 6 is a temperature-entropy diagram showing heat transfer between the two working mediums.

Reference is now made to the temperature-entropy diagram in FIG. 5 and the heat flow between the mediums in FIG. 6, which represents the temperature and entropy states in the cycle of the present invention. These diagrams illustrate the cycle in the conventional manner used for thermodynamic analysis and thus best describe the invention.

Starting with the gaseous working medium, such as an air-fuel mixture, the states of the gaseous medium will be set forth through the entire cycle, then the states of the dense working medium will be set forth through the entire cycle, and the heat exchange relationships will be described.

From point A to point A1 the gaseous working medium entering the system at atmospheric pressure receives heat (from the dense working medium vapor, hereinafter, referred to as DWMV, 10 to 10A which cannot give up sufficient heat at C1, C2 to revert back to a liquid, as will be explained later). This gives the gaseous medium an increase in temperature, enthalpy and entropy and increase in volume at constant pressure. From point A1 to point B1 this gaseous working medium intake (hereinafter referred to as GWMI) is compressed, coverting a portion of the mechanical energy from a rotary drive output to latent energy by reason of distortion. This gives the GWMI an increase in temperature, ethalpy, pressure at constant entropy, and a decrease in volume. From point B1 to point B2 GWMI receives heat from GWME (gaseous working medium exhaust) M to M1 which has passed completely through the system and is about to be expelled but still contains some heat energy. This causes the GWMI to drop in pressure, and increase in volume, temperature, enthalpy and entropy. Point B2 is also point C1. Many of the points are identified with multiple symbols which will relate to different locations on the block diagram in FIG. 7 as will be explained later. In going from point C1 to point C2, the GWMI receives heat from DWMV as its state changes from point 10B to point 10A. The GWMI drops in pressure, and increases in volume, temperature, and enthalpy at constant entropy. From point D1 (C2) to point D2 the GWMI receives heat from GWME as its state changes from point L to point L1 (as it comes from the primary heat exchanger and before it is passed on the B1, B2 in the diagram in FIG. 7). This results in an increase in temperature and enthalpy, with a constant entropy of the GWMI. From point E (D2) to point E1 the GWMI is forced through a venturi or mixing chamber in FIG. 7 with an increase in velocity and reduction in pressure at the throat. Here it is mixed with liquid fuel at a lower temperature, then the gaseous working medium mixture (GWMM) expands with a reduction in velocity, increase in pressure, and drop in temperature, enthalpy and entropy. From point F (E1) to point F1 the velocity of the GWMM is reduced to the point where heat radiated from a mechanical heat source or from prior continuous reaction can travel at a speed equivalent to the velocity of the GWMM, raising its temperature to the point where a chemical reaction takes place between the various constituants of the fuel and the oxygen in the air. The sensible heat released by this chemical reaction is absorbed by the products involved in this chemical reaction, causing them to increase in temperature and entropy, enthalpy, pressure and volume as the products of combustion are separated from the nonreacting elements of the GWMI. These nonreacting elements or gases, having a different specific heat than the products of combustion, and follow the line from point G to point G1. The nonreacting gases mix with the GWM CP (combustion products) where over a period of time heat is transferred from the GWMCP to the nonreacting gases with the combustion products having a reduction in temperature, pressure, volume, entropy and enthalpy. Velocity of both the combustion products and the nonreacting gases are continuously dropping. From point H (G1) to point H1 the GWM now transfers heat to the DWML (dense working medium liquid) as its state changes from point 2A to point 2B, as they travel parallel courses in the same direction in the apparatus in FIG. 7. The GWM witnesses a drop in pressure, temperature, velocity, volume, entropy and enthalpy. From point H1 to point J the GWM is removed from contact with the DWML and brought in contact with the DWMV (dense working medium vapor) at a point where it is leaving the primary heat exchanger, enroute to the reciprocating drive unit, as will be explained hereinafter with reference to FIG. 7. During this state the GWM has a drop in pressure, increase in volume, drop in temperature, increase in entropy, and a constant enthalpy. From point J to point J1 the GWM gives up heat to the DWMV between points 2B and 3 as they physically travel in opposite directions in relation to each other in the apparatus of FIG. 7. The GWM has a drop in temperature, pressure, volume, velocity, entropy and enthalpy. From point K to point K1 the GWM is removed from contact with the DWMV at its point of lowest temperature and brought in contact with DWML which has not yet entered the primary heat exchanger in FIG. 7. Heat is transferred from the GWM to the DWML, resulting in constant pressure, reduction in volume, constant velocity, drop in temperature, entropy and enthalpy of the GWM. From point L (K1) to point L1 the GWME (gaseous working medium exhaust) transfers heat, as shown by the arrows in FIG. 6, to GWMI between points D1, D2 while traveling in contra-flow courses in the apparatus of FIG. 7. The GWME drops in pressure, volume, velocity, temperature, entropy and enthalpy. From point M (L1) to point M1, the GWME gives up heat to GWMI between points B1, B2 while traveling in contra-flow courses in the apparatus in FIG. 7. The GWME has a drop in pressure, volume, velocity, temperature, entropy and enthalpy. From point M1 to point M2 (A) the GWME gives up heat to the atmosphere, resulting in a drop in temperature, entropy, enthalpy, pressure, volume and velocity. The GWM portion of the cycle has made a complete circle, arriving back at point A (at atmospheric temperature and pressure).

The dense working medium (DWM) portion of the cycle will now be described, still referring to FIGS. 5 and 6.

From point 1 to point 2 the DWML is compressed to above the critical pressure of the DWM without addition of heat. Temperature is increased and a portion of mechanical energy from the rotary drive is converted to latent energy by reason of distortion, and entropy drops slightly, with increase of temperature without addition of heat. The enthalpy increases by reason of mechanical work being done on the DWML. From point 2 to point 2A the DWML expands from pump outlet pressure down to system pressure with a decrease in temperature, decrease in enthalpy, and increase in entropy. At the same time DWML receives heat radiated from interior of primary heat exchanger, which it encloses as shown in FIG. 7, with an increase in temperature, entropy and enthalpy, a drop in pressure and an increase in volume. From point 2A to point 2B the DWML receives heat from the GWM, H to H1 and K to K1, with an increase in temperature, entropy and enthalpy at constant pressure and increasing volume. During this stage the DWML and the GWM are traveling parallel paths in the same direction in the apparatus shown in FIG. 7. The GWM is moving faster than the DWML so that as the DWML increases in temperature and the GWM drops in temperature, the temperature difference will at all times be in favor of GWM being higher. Due to their extreme differences in density, a large volume of GWM can transfer its heat energy to a small volume of DWML, therefore, the heat flow ratio is adjusted accordingly. At point 2B the DWM which has reached critical temperature is separated from the DWML and is now DWMV. At this point the DWMV has an entropy level which is at the very peak of the vapor dome; any decrease in temperature would result in precipitation. From point 2B to point 3 the DWMV receives heat from the GWM (J to J1) with an increase in temperature, entropy and enthalpy at constant pressure and increasing volume. During this stage, the DWMV and the GWM are traveling in opposite directions in the FIG. 7 apparatus so that the DWMV is continuously coming in contact with GWM of a higher temperature. The enthalpy is here raised to a point where expansion to atmospheric pressure with its attendant drop in temperature and a margin for radiation losses will not cause passage through the top of the retrograde vapor dome of the type of DWM being used. Stated differently, point 3 on the T–s diagram must be sufficiently far to the right so that a line straight down (constant entropy) will not pass through the vapor dome. From point 3 to point 3A, which are the same point on a T–s diagram, the DWMV is metered in volume by time periods with no reduction in pressure, temperature, entropy or enthalpy, and passes into the cylinder of the reciprocating drive. From point 3A to point 4 the DWMV expands in the cylinder of the reciprocating drive, converting latent energy by reason of distortion into mechanical energy with a drop in temperature, pressure and enthalpy, and an increase in volume. There is also a drop in entropy due to radiation losses. During this state, DWMV must not pass through vapor dome or partial condensation will result. From point 4 to point 5 DWMV expands out of an exhaust port of the cylinder of the reciprocating drive to nozzles of the rotary drive, with a decrease in pressure, increase in volume, drop in temperature and increase in entropy. The enthalpy remains the same except for slight radiation loss. Then, depending upon the speed of the piston at the instant on return stroke, pressure increases, remains constant or decreases. The state line between points 4, 5 on the T–s diagram moves up and down with load changes—up with increased load (4A, 5A), down with decreased load (4B, 5B). From point 5 to point 6 DWMV expands through the nozzles and blades of the rotary drive, converting the remaining latent energy by reason of distortion, into kinetic energy by reason of velocity, with a drop in pressure, increase in volume, drop in temperature, enthalpy and a drop in entropy, due to radiation. The kinetic energy is converted to mechanical energy as the blades of the rotary drive absorb the kinetic energy of the vapor which impinges upon the blades and has its direction changed. From point 6 to point 6A the DWMV is brought into contact with DWML at a lower temperature traveling at high velocity. Heat is transferred from DWMV to DWML, causing partial condensation (6A to 7). The kinetic energy of the high velocity DWML carries both through a check valve against a higher pressure. From point 6 to point 6A pressure and temperature of the DWMV drop, due to heat transfer to the DWML, with a drop in enthalpy, entropy, and volume, due to partial condensation (entering the vapor dome on T–s diagram). Second (6A to 7) pressure of DWML–L mixture increases as kinetic energy is converted to latent energy by reason of distortion, with an increase in temperature, but drop in entropy, moving further into the vapor dome on the T–s diagram. From point 7 to point 10 any DWM which still contains enough heat to support a vapor state at the existing pressure in the low pressure economizer is separated from the liquid, as shown in FIG. 7. From points 10 and 10B to point 10A the DWMV gives up heat to GWM between points C1 and C2, and between points, A, A1, until it reverts to DWML and returns to point 7A. Here is a drop in temperature, entropy and enthalpy at constant pressure all taking place within the vapor dome of the T–s diagram until the liquid state is reached, when it moves out of the lower entropy side of the dome. At point 7A (10A) the DWML is divided into two paths, one part being compressed by the centrifugal pump to point 11 where a portion of the mechanical energy from the rotary drive is converted back to kinetic energy by imparting velocity to the DWML as it passes through the nozzle of the jet condenser. There is an increase in temperature, pressure, enthalpy at constant entropy; then an increase in volume, reduction in pressure, temperature, before DWML comes in contact with DWMV from the exhaust of the rotary drive at point 6A. From point 7A to point 9 (1) the other portion of DWML receives heat, by radiation from the high pressure economizer which is encloses, as shown in FIG. 7, at constant pressure, increase in temperature, entropy, enthalpy and volume. At point 1 (9) the DWML is picked up by the pump at low pressure and recycled. This completes one cycle of the dense working medium.

FIG. 7 shows in block diagram form how the processes described with reference to the T–s diagram may be accomplished by suitable apparatus. The letters and numbers in FIG. 7 identify apparatus which produce the changes in state which have been described by the same letters and numbers on the T–s diagrams in FIG. 5 and FIG. 6. Air from the atmosphere enters the system through overload air blower 50 which is in operation only during overload conditions in order to assure an adequate supply of air, through heat exchanger 52, to condense all of the vaporous working medium which enters the heat exchanger. Heat exchanger 52 preheats the air coming into the system with heat taken from condensing vapors from the DWM. Air pump 54 picks up a portion of the air from heat exchanger 52 and pushes it on into heat exchanger 56. Heat exchanger 56 further preheats the air, using the heat from exhaust combustion products which are leaving the system through the exhaust turbine 58 which drives the air pump 54. Heat exchanger 60 further preheats the air coming from heat exchanger 56, using heat from vapor rising off the dense working medium. Heat exchanger 62 further preheats the air coming from heat exchanger 60 using heat from exhaust products of combustion as they come from the vapor generator section. Mixing chambers 64 mix fuel from fuel pump 66 with preheated air from heat exchanger 62. This mixture then enters combustion chamber 68 where chemical reaction takes place and the products of combustion then flow through the velocity reduction chamber 70. In the velocity reduction chamber the heat released by the chemical reaction is absorbed by the products of combustion and the nonreacting gases. In heat exchanger 72 the products of combustion give up heat to the dense liquid medium. The products of combustion then flow into heat exchanger 74 where heat is transferred to the vaporous dense working medium. The products of combustion now flow into heat exchanger 76 where heat is transferred to dense working medium liquid which has not yet entered heat exchanger 72. From heat exchanger 76 the exhaust products of combustion flow first through heat exchanger 62, then through heat exchanger 56 before leaving the system through turbine 58.

Low pressure economizer 78 is a double walled container which encloses high pressure economizer 80 and heat exchangers 72, 74 and 76, and combustion chamber 68 and velocity reduction chamber 70. Within the double walls of low pressure economizer 78 there is a dense working medium liquid 82 up to a level approximately 20% of the distance down from the top. Any dense working medium which enters the low pressure economizer 78 still containing enough heat to sustain a vapor state rises to the space 84 above liquid level and then rises to vapor condenser heat exchanger 60. Any vapor which is not condensed in heat exchanger 60 rises to vapor condenser heat exchanger 52.

From the bottom of low pressure economizer 78, the dense working medium liquid 82 is picked up by a dense working medium pump 86 where its pressure is increased to system pressure which is above critical pressure for the dense working medium being used. As an example the critical pressure of trichloroethylene is 717.51 p.s.i. and the system pressure used is 1500 p.s.i. From pump 86 the DWML enters high pressure economizer 80 which is a solid wall of tubing surrounding heat exchangers 72, 74 and 76 and combustion chamber 68 and velocity reduction chamber 70. Any heat radiated by sections 68, 70, 72, 74 and 76 is absorbed by the DWML in high pressure economizer 80. Any heat radiated outward by high pressure economizer 80 is absorbed by DWM in the low pressure economizer 78. From the high pressure economizer 80 the DWML flows into heat exchanger 76 where it receives heat from combustion products. From heat exchanger 76 the dense working medium liquid flows into liquid separator 88. From the vapor separator the DWML circulates through heat exchanger 72, receiving heat from combustion products. From vapor separator 78 DWMV flows into heat exchanger 74 where it receives additional heat from combustion products. From heat exchanger 74 DWMV flows to reciprocating valve 90 which meters by volume and time periods the DWMV which then flows into reciprocating drive 92. In reciprocating drive 92 the DWMV expands, pushing back a piston. From the exhaust port of the reciprocating drive 92 the DWMV flows through rotary drive valving 94 where it is distributed through a plurality of nozzles the number of which depends upon the magnitude of the load 96. From the rotary valve the DWMV expands through the nozzles and blades of rotary drive 98, causing the rotary drive to rotate at high speed. The mechanical energy is added to that produced by the reciprocating drive by hydraulic speed reducer 100.

Centrifugal pump 102, which is driven by the high speed side of rotary drive 98, takes DWML from the bottom of low pressure economizer 78 and forces it at high pressure through a nozzle within the venturi in jet condenser 104. The low pressure side of the venturi in jet condenser 104 is connected directly with the exhaust port of rotary drive 98. Jet condenser 104 thus tends to pull the exhaust DWMV out of rotary drive 98 and mixes it with DWML at a much lower temperature, thus causing partial condensation. The mixture of DWML and DWMV from the jet condenser is forced against higher pressure into low pressure economizer 78.

Electric generator 106 is also driven from the high speed side of rotary drive 98 and provides electrical current to operate pumps 86 and 66.

It will be noted that any heat radiated outward from the high temperature combustion chamber and heat exchangers will be pumped back inward with the DWML as it is circulated through the system.

While the preferred method has been described in sufficient detail to enable one to practice the invention, deviations and modifications will occur to those skilled in the art and it is to be understood that these variations are to be considered as part of the invention as set forth in the claims.

I claim:
1. A process of converting heat energy into mechanical energy, comprising the steps of:
 (a) heating a dense working medium to a high energy state;
 (b) admitting a portion of the dense working medium into a reciprocating drive fluid expander and converting energy contained in the dense working medium into mechanical energy;
 (c) admitting exhaust from the reciprocating drive fluid expander into a rotary drive fluid expander and converting energy contained in said exhaust into mechanical energy;
 (d) combining mechanical energies of the reciprocating drive and rotary drive fluid expanders to achieve a common mechanical energy output; and
 (e) reducing back pressure on the rotary drive fluid expander by injecting relatively low temperature dense working medium liquid at relatively high velocity into exhaust vapor of the rotary drive fluid expander.

2. The process according to claim 1, including the step of:
 partially condensing the exhaust vapor of the rotary drive fluid expander by simultaneously directing the exhaust vapor into a venturi arrangement and injecting the dense working medium liquid into the venturi arrangement.

3. The process according to claim 2, including the step of:
 transferring heat liberated during partial condensation of the exhaust vapor to a gaseous working medium so that said heat may be conserved.

4. The process according to claim 3, comprising the step of:
 applying the conserved heat to the dense working medium before it is admitted into the reciprocating drive fluid expander.

5. The process according to claim 3, including the step of:
 transferring heat contained in exhaust of the gaseous working medium to a relatively cooler portion of the gaseous working medium so that it may be conserved and subsequently applied to the dense working medium before it is admitted into the reciprocating drive fluid expander.

References Cited

UNITED STATES PATENTS

| | | | |
|---|---|---|---|
| 1,933,041 | 10/1933 | Bauer | 60—21 |
| 1,973,443 | 9/1934 | Preisig | 60—21 |
| 325,860 | 9/1885 | Pertz | 60—93 |
| 617,807 | 1/1899 | Colwell | 60—93 |

MARTIN P. SCHWADRON, Primary Examiner

R. R. BUNEVICH, Assistant Examiner

U.S. Cl. X.R.

60—21, 93